United States Patent [19]
Ivey et al.

[11] Patent Number: 4,953,017
[45] Date of Patent: Aug. 28, 1990

[54] SIMULTANEOUS TELEVISION PICTURE AND MEASUREMENT DISPLAY

[75] Inventors: Matthew A. Ivey, Portland; Davorin Fundak, Aloha, both of Oreg.

[73] Assignee: Tektronix, Inc., Beaverton, Oreg.

[21] Appl. No.: 364,752

[22] Filed: Jun. 12, 1989

[51] Int. Cl.⁵ .............................................. H04N 17/02
[52] U.S. Cl. ...................................... 358/139; 358/10
[58] Field of Search ................................... 358/10, 139

[56] References Cited

U.S. PATENT DOCUMENTS

| | | | |
|---|---|---|---|
| 3,330,907 | 7/1967 | Arimura | 358/139 |
| 3,337,684 | 8/1967 | Sadler | 358/139 |
| 3,435,136 | 3/1969 | Bachmann | 358/139 |
| 3,984,862 | 10/1976 | Volz | 358/10 |
| 4,058,826 | 11/1977 | Schneider | 358/10 |
| 4,135,203 | 1/1979 | Friedman | 358/139 |
| 4,145,706 | 3/1979 | Hess | 358/10 |
| 4,158,857 | 6/1979 | Hiraguri | 358/139 |
| 4,276,563 | 6/1981 | Heitmann | 358/139 |
| 4,364,080 | 12/1982 | Vidovic | 358/10 |
| 4,740,841 | 4/1988 | Slavin | 358/139 |

Primary Examiner—Howard W. Britton
Attorney, Agent, or Firm—Francis I. Gray

[57] ABSTRACT

A television picture on a television test and measurement instrument adds a vertical sweep generator, and if necessary a horizontal sweep generator, to a conventional instrument. Vertical and horizontal sweep triggers are generated by a sync processor of the instrument from an input video signal to drive the respective sweep generators. A vertical sweep signal from the vertical sweep generator is input to a switch together with the input video signal. The output of the switch drives a vertical deflection circuit such that when the input video signal is output from the switch the instrument is in standard waveform monitor mode, and when the vertical sweep signal is output from the switch the instrument is in a picture mode to provide a raster scan image of the input video signal on a display. Also the horizontal sweep signal may be input to the switch such that the horizontal and vertical deflection circuits are driven by component signals from the input video signal in a vectorscope mode, and by the horizontal and vertical sweep signals in the picture mode. For apparent simultaneous display of the measurement signal and the video picture, switching occurs at a field or frame rate.

9 Claims, 3 Drawing Sheets

SIMULTANEOUS TELEVISION PICTURE AND MEASUREMENT DISPLAY

BACKGROUND OF THE INVENTION

The present invention relates to television video processing, and more particularly to a means for displaying a television picture simultaneously with a measurement display on a television test and measurement instrument.

A television test and measurement instrument displays in analog form selected video lines of data from a television video signal, either as a signal waveform or as a chrominance vector display. Essentially the measurement instrument is a special purpose oscilloscope which automatically triggers on a horizontal sync pulse from the input video signal and has internal circuitry for detecting and selecting a specific field and horizontal line of video information for processing and display. In order to see the effect on a television picture of an anomaly noted on a measurement instrument, a separate picture monitor is required. When observing video signals within a control room or studio environment, there is usually a monitor readily available. However in the field it is often desirable to observe both the measurement display and the effect on a television picture simultaneously. Currently this requires both the television monitor and the measurement instrument, which adds to the amount of equipment required by a service technician.

A prior instrument, the 2710 Spectrum Analyzer manufactured by Tektronix, Inc. of Beaverton, Oreg., has a video monitor option that allows a video signal to be displayed on the same screen as that used to display the spectrum of an input signal. For a video display the video input signal is switched to be input to the Z-axis driver of the display cathode ray tube (CRT), and also is switched to be input to a sync generator circuit to extract horizontal and vertical sync signals that are used to generate horizontal and vertical ramp signals at television rates to provide a raster display on the monitor of the input video signal.

Another prior instrument, the 1720 Vectorscope also manufactured by Tektronix, Inc. of Beaverton, Oreg., has a simultaneous display feature that is described in co-pending U.S. patent application Ser. No. 07/274,689, a continuation of an application filed originally on Mar. 17, 1986. This feature allows two signals that require different processing techniques, such as chrominance vector signals from chrominance demodulators and stereo audio signals from audio amplifiers, to be displayed apparently simultaneously on the same monitor by switching between the two signal sources at a rate that is unrelated to the horizontal line rate to prevent beat frequencies.

What is desired is a test and measurement instrument that combines the features of a test and measurement instrument and a picture monitor into a single instrument to display simultaneously a video picture and a measurement display for an input video signal.

SUMMARY OF THE INVENTION

Accordingly the present invention provides for the display of a television picture simultaneously with a measurement display on a test and measurement instrument. A vertical sweep circuit is added to the test and measurement instrument. The vertical sweep circuit has as an input a vertical sync signal derived from a input video signal via a sync processor. The sweep signal from the vertical sweep circuit is input to a switch as is the input video signal. In the measurement display mode the vertical deflection circuit of a display device is driven by the input video signal, or a component signal derived from the input video signal, via the switch. In the picture monitor mode the sweep signal from the vertical sweep circuit is input to the vertical deflection circuit from the switch so that a raster scan image is provided, with the input video signal providing the intensity control. In like manner, if there is no horizontal sweep circuit already in the horizontal deflection circuit, such as in a vector measurement display, the horizontal sweep circuit is switched into the horizontal deflection circuit for the picture monitor mode. The rate at which the switching is cycled is a multiple of the field rate so that for one field or frame the picture is displayed, and the next field or frame the desired measurement is displayed to provide an apparent simultaneous display.

The objects, advantages and novel features of the present invention are apparent from the following detailed description when read in conjunction with the appended claims and attached drawing.

DESCRIPTION OF THE PREFERRED EMBODIMENT

Figure 1:
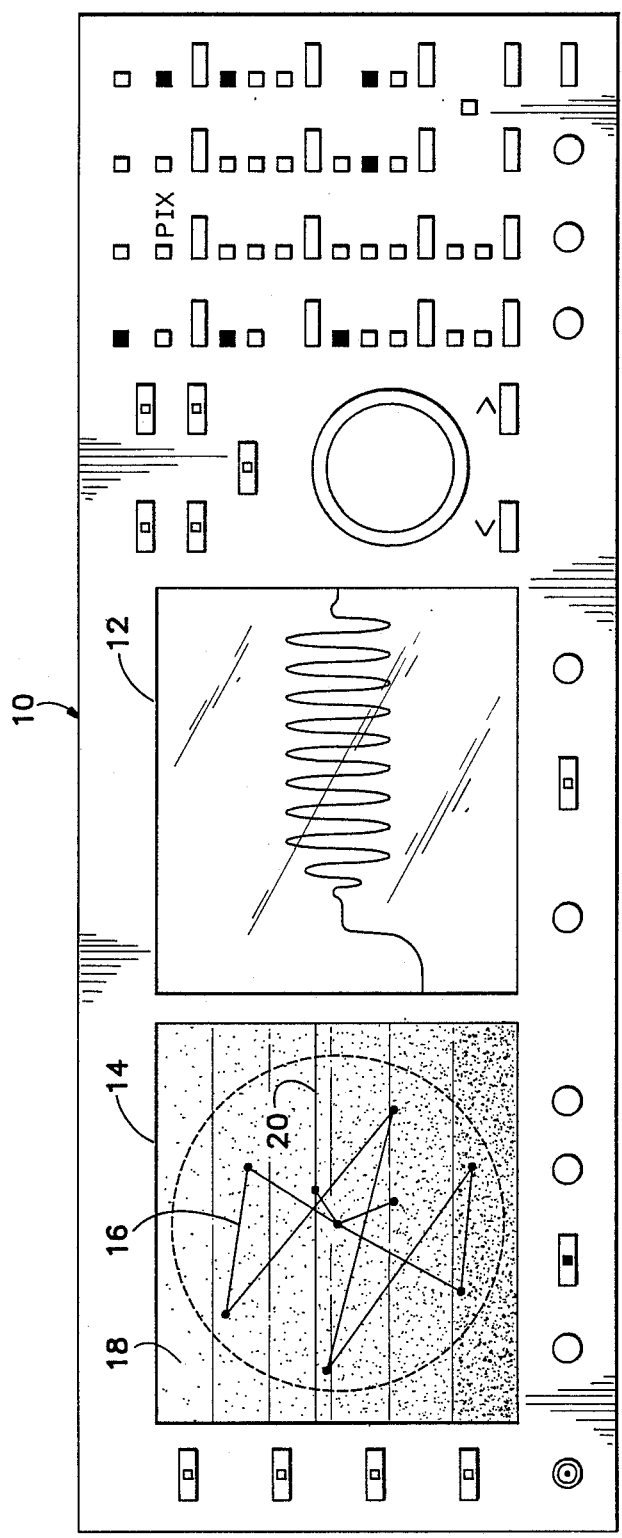
FIG. 1 is a plan view of a front panel of a television test and measurement instrument incorporating the simultaneous picture and measurement display of the present invention.

Referring now to FIG. 1 a television test and measurement instrument for simultaneous picture and measurement display 10 is shown. The particular instrument shown has two display areas 12, 14, one for a waveform monitor display and the other for a vectorscope display. On the vectorscope display 14 is shown both a vector measurement display 16 and a picture display 18 of horizontal color stripes. Also shown on the vector measurement display 16 is a highlighted horizontal line 20 that is displayed when the instrument is in a line select mode, indicating the horizontal line of the video that is being displayed on the waveform monitor and vectorscope displays. In this way a service technician can observe the picture as well as the waveform monitor and vectorscope displays simultaneously on two side-by-side display devices, with one of the display devices simultaneously displaying two different types of information—picture and vector; or picture and waveform.

Figure 2:
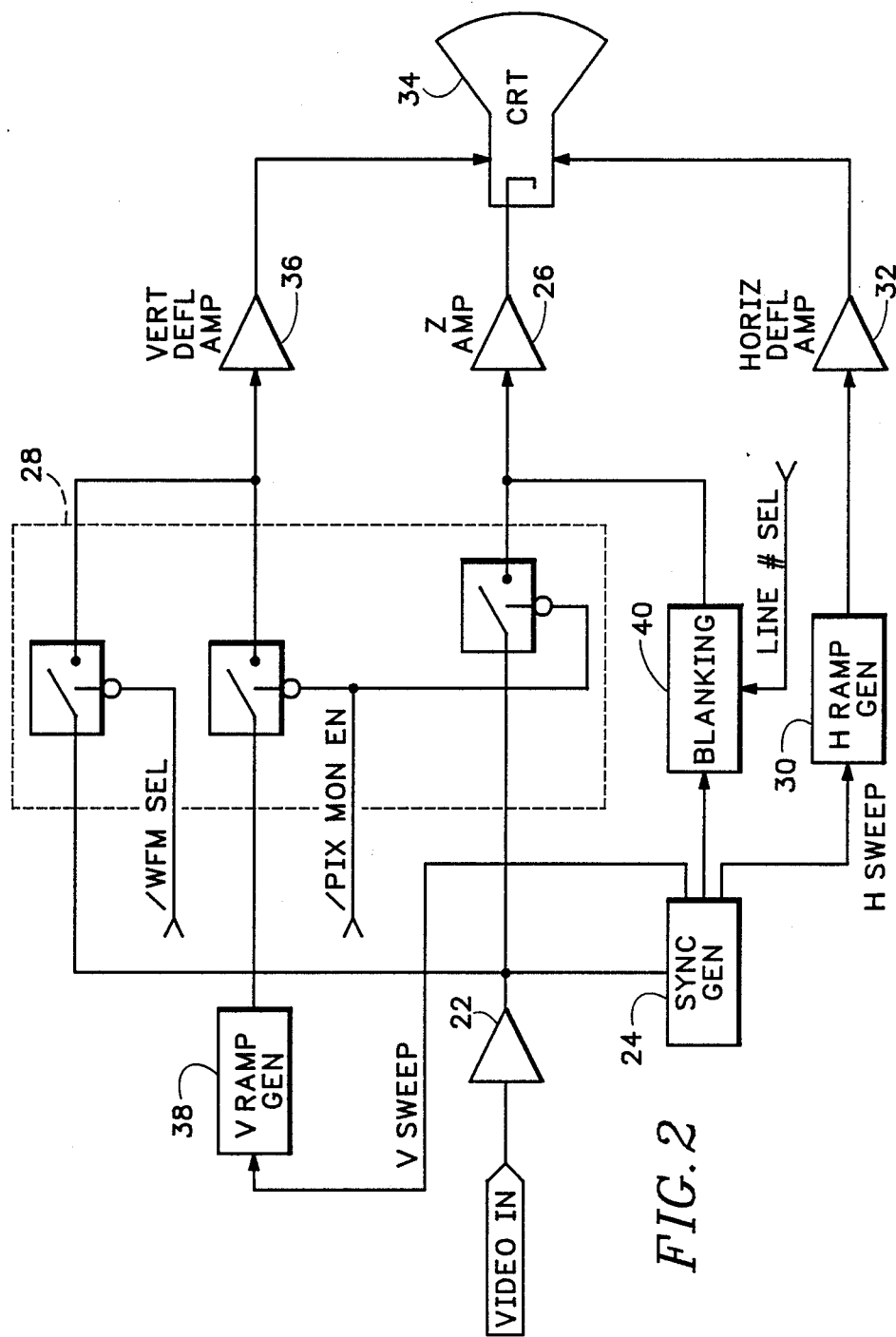
FIG. 2 is a block diagram view of a television waveform test and measurement instrument incorporating the present invention.

As shown in FIG. 2 a video signal is input to a buffer amplifier 22. The buffered video signal is input to a sync generator 24 and a switch 28. The sync generator 24 provides a horizontal sweep trigger HSWEEP to a horizontal sweep circuit 30. The output of the horizontal sweep circuit 30 is input to a horizontal deflection amplifier 32 which in turn drives the horizontal deflection coils of a cathode ray tube (CRT) 34, or otherwise drives a horizontal line across a display surface. HSWEEP is timed so that the horizontal sweep signal from the horizontal sweep circuit 30 occurs during the active video portion of each horizontal line of video data. A Z-axis amplifier 26 controls the intensity of the electron beam as it is moved horizontally across the display device 34. For a waveform display an output of the switch 28 is the buffered video signal which is input to a vertical deflection amplifier 36, the output of which is used to drive the vertical deflection coils of the CRT 34 to provide the vertical variations of the electron beam during each horizontal trace, corresponding to the amplitude of the video signal.

The description so far is that of a conventional waveform monitor with the exception of the switch 28. In the normal waveform monitor the buffered video signal is input directly into the vertical deflection amplifier 36. However in the present application the sync generator 24 also provides a vertical sweep trigger signal VSWEEP to a vertical sweep generator 38. The output of the vertical sweep generator 38 is input to the switch 28 so that either a vertical sweep signal or the buffered video signal may be selected for input to the vertical deflection amplifier 36. VSWEEP is timed to start with the first horizontal line having active video information for display, i.e., picture information. The result is that in the picture mode the vertical deflection of the CRT 34 is controlled by the vertical sweep signal so that each horizontal line of the buffered video signal occurs at a different vertical level on the CRT, i.e., a raster scan interlaced television picture is displayed on the CRT with the buffered video signal providing the intensity variations via the switch 28 to the Z-axis amplifier 26.

Figure 3:
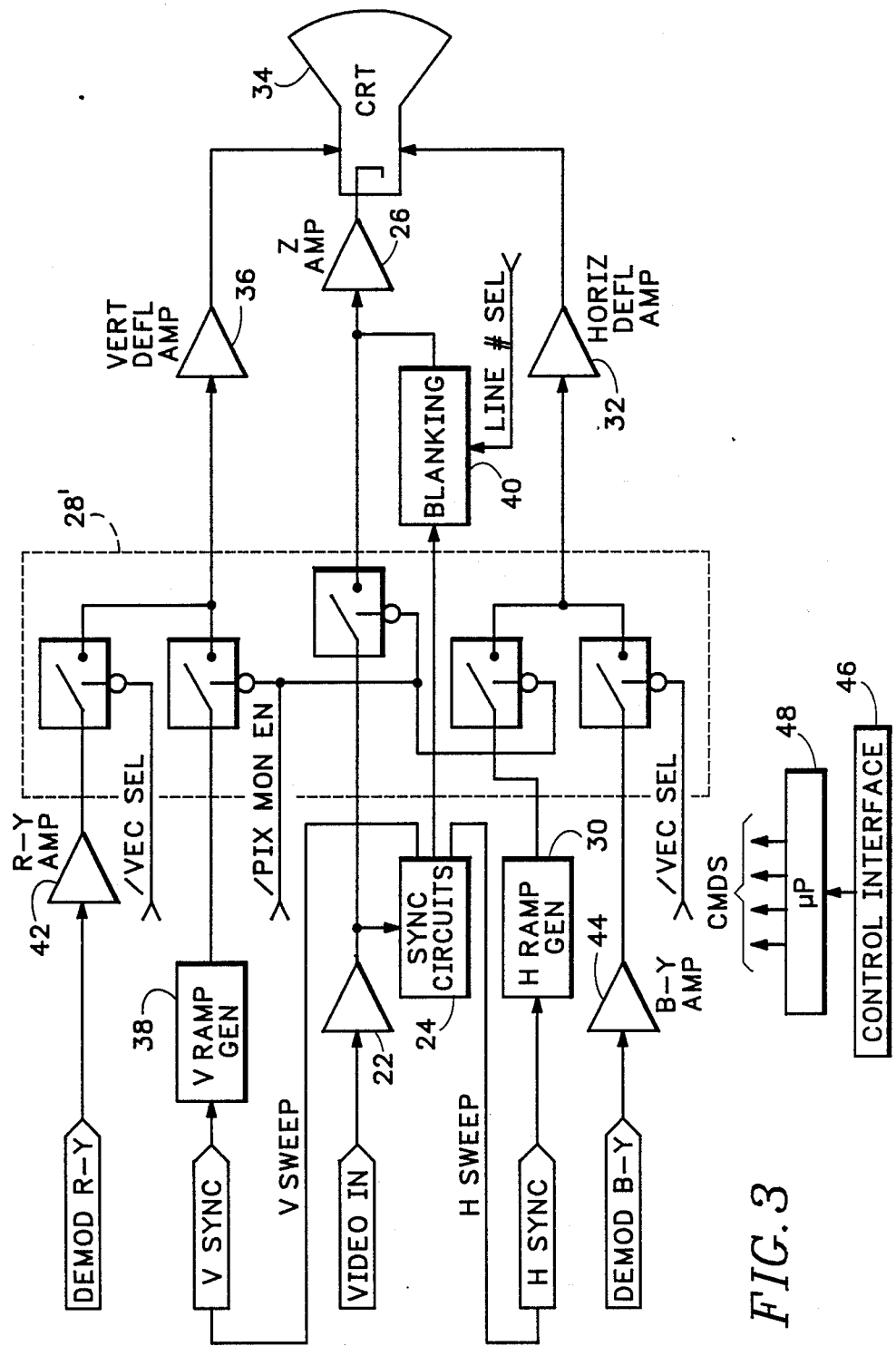
FIG. 3 is a block diagram view of a television vectorscope test and measurement instrument incorporating the present invention.

In order to display a video picture on a vectorscope display, both a vertical ramp generator 38 and a horizontal ramp generator 30 have to be switched into the inputs of the vertical and horizontal deflection amplifiers 36, 32 by switch 28, in lieu of vector signals from R-Y and B-Y amplifiers 42, 44, as shown in FIG. 3. The operation of the vectorscope with a simultaneous video monitor display is the same as that described above for the waveform monitor. The display configuration, either measurement, video or simultaneous, is input by an operator via a control interface 46, such as push buttons on the front panel of the instrument 10. The configuration selected is executed by a microprocessor 48 that generates the switching commands for the switch 28', 28 either as a steady state signal, or as an alternating signal at either a field or frame rate to provide the simultaneous display of both the measurement and video signals.

Although the present invention has been described with respect to video characteristics of an input video picture, the raster picture display may also be displayed simultaneously with any other related signal, such as an X-Y coordinate audio display or an SC/H display.

Thus the present invention provides a simultaneous raster video display and a measurement display on a single monitor by switching in appropriate sweep circuits to generate a raster display at a field or frame rate so that both displays appear apparently simultaneously.

What is claimed is:

1. An improved measurement instrument for displaying a measurement signal representing an attribute of an input video signal, the instrument being of the type having means for deriving timing signals from the input video signal, means for horizontally and vertically driving a display device, and means for controlling the intensity of an image on the display device, wherein the improvement comprises:

means for generating a vertical sweep signal from the input video signal; and means for switching between the vertical sweep signal and the input video signal as an input to the vertically driving means, and for switching the input video signal as an input to the controlling means so as to provide a raster scan image of the input video signal on the display device, the switching occurring at a rate that produces an apparent simultaneous display of a video image corresponding to the input video signal and of the measurement signal.

2. An improved measurement instrument as recited in claim 1 further comprising:

means for generating a horizontal sweep signal from the input video signal; and means for switching between the horizontal sweep signal and a horizontal drive signal as an input to the horizontally driving means, the switching occurring at the rate to produce the apparent simultaneous display.

3. An improved measurement instrument as recited in claim 2 further comprising means for highlighting on the video image the attribute represented by the measurement signal.

4. A system for simultaneously displaying a video picture and a measurement signal for an input signal related to the video picture on a single display device comprising:

means for displaying a measurement signal representing a characteristic of the input signal;

means for displaying a raster scan image representing the video picture related to the input signal; and means for switching between the measurement signal and the raster scan image displaying means at a rate to provide an apparent simultaneous display of the measurement signal and the raster scan image.

5. A system as recited in claim 4 wherein the raster scan image displaying means comprises:

means for generating orthogonal ramp signals for the display device, the ramp signals being derived from an input video signal and being repetitive at raster scan rates; and means for applying the input video signal to the display device to provide a variable intensity signal for the raster scan image as a function of the amplitude of an active portion of the input video signal.

6. A system as recited in claim 4 wherein the measurement signal displaying means comprises:

means for applying a first chrominance component of an input video signal to a first axis of the display device;

means for applying a second chrominance component of the input video signal to a second axis of the display device, the first and second axes being orthogonal; and means for providing a predetermined intensity level for the display device during an active portion of the input video signal.

7. A system as recited in claim 6 wherein the raster scan image displaying means comprises:

means for generating a ramp signal for each axis of the display device, the ramp signals being derived from the input video signal and being repetitive at raster scan rates; and means for applying the input video signal to the display device to provide a variable intensity signal for the raster scan image as a function of the amplitude of the active portion of the input video signal.

8. A system as recited in claim 4 wherein the measurement signal displaying means comprises:
  means for applying a ramp signal derived from an input video signal to a first axis of the display device;
  means for applying the input video signal to a second axis of the display device, the axes being orthogonal; and
  means for providing a predetermined intensity level for the display device during an active portion of the input video signal.

9. A system as recited in claim 8 wherein the raster scan image displaying means comprises:
  means for generating a ramp signal for the second axis of the display device, the ramp signals for the axes being derived from the input video signal and being repetitive at raster scan rates; and
  means for applying the input video signal to the display device to provide a variable intensity signal for the raster scan image as a function of the amplitude of the active portion of the input video signal.

* * * * *